United States Patent [19] [11] Patent Number: 5,038,009
Babbitt [45] Date of Patent: Aug. 6, 1991

[54] PRINTED MICROWAVE SUSCEPTOR AND PACKAGING CONTAINING THE SUSCEPTOR

[75] Inventor: Robert J. Babbitt, Bensalem, Pa.

[73] Assignee: Union Camp Corporation, Wayne, N.J.

[21] Appl. No.: 439,120

[22] Filed: Nov. 17, 1989

[51] Int. Cl.⁵ ............................................. H05B 6/80
[52] U.S. Cl. ...................... 219/10.55 E; 219/10.55 F; 426/107; 426/234; 426/243; 99/DIG. 14
[58] Field of Search .................. 219/10.55 E, 10.55 F, 219/10.55 M, 10.55 R; 426/107, 241, 243, 234; 99/DIG. 14; 126/390

[56] References Cited

U.S. PATENT DOCUMENTS

| | | | |
|---|---|---|---|
| 4,676,857 | 6/1987 | Scharr et al. | 426/107 |
| 4,800,247 | 1/1989 | Schneider et al. | 219/10.55 E |
| 4,864,089 | 9/1989 | Tighe et al. | 219/10.55 E |
| 4,865,921 | 9/1989 | Hollenberg et al. | 219/10.55 E |
| 4,866,232 | 9/1989 | Stone | 219/10.55 E |
| 4,883,936 | 11/1989 | Maynard et al. | 219/10.55 F |
| 4,914,266 | 4/1990 | Parks et al. | 219/10.55 E |
| 4,917,748 | 4/1990 | Harrison | 219/10.55 E |
| 4,943,456 | 7/1990 | Pollart et al. | 426/107 |

Primary Examiner—Philip H. Leung
Attorney, Agent, or Firm—Edward J. Sites

[57] ABSTRACT

A susceptor for use in microwave heating and a method of manufacturing a susceptor for use in microwave heating are shown to include a substrate and a coating of electrically conductive particles applied to the substrate in a pattern that results in a distribution of microwave energy across the pattern so that burning or charring of the substrate is substantially prevented. The coating is an ink coating and the ink coating is applied to the substrate in a printing operation. The pattern is shown to include a plurality of subpatterns located within an effective heating area wherein the positioning of subpatterns is sufficient to radiate the desired heat without burning.

37 Claims, 7 Drawing Sheets

_Fig. 9_

_Fig. 10_

_Fig. 11_

PRINTED MICROWAVE SUSCEPTOR AND PACKAGING CONTAINING THE SUSCEPTOR

FIELD OF THE INVENTION

The present invention relates to the field of microwave heating and more particularly to susceptors used in packaging for the generation of heat in microwave ovens.

BACKGROUND OF THE INVENTION

As a result of the increasing popularity of the microwave oven, various food products have been introduced that are prepared and packaged in a fashion susceptible to so-called one-step cooking. The consumer need only place the food product in a microwave oven for a prescribed period of operating time, after which the package can be opened and the cooked or heated food eaten. The preparation of many of these food products requires the generation of auxiliary heat, i.e., heat other than that heat induced in the food product itself by operation of the microwave energy. For example, such food products include those that are prepared by browning or crisping the exterior surface. Such food products typically require the use of a susceptor when prepared in a microwave oven in order to generate the heat necessary to produce browning or crisping. A susceptor is a device that when placed in a microwave field absorbs microwave energy and converts it into heat. Additionally, the preparation of other food products, such as popcorn, require the use of a susceptor in order to bring the oil or grease ingredient to a desired temperature. To these ends, several devices have been previously proposed for the generation of such auxiliary heat.

U.S. Pat. No. 4,190,757— Turpin, et al., discloses a microwave heating package that includes a susceptor for generating heat necessary to prepare food products such as pizza, french fries, hash brown potatoes, onion rings, etc. The susceptor is described as a composite or laminate consisting of an upper structural support member and a heating layer. The heating layer is said to include any suitable microwave absorptive lossy substance that will reach a temperature above 212° C. when exposed to microwave energy. The heating layer is described as a relatively thin layer of paint having a binder that bonds or cements absorbent particles together. Although shown as a continuous layer, it is stated that the heating layer may not be continuous, i.e., it can be provided in two or more strips or bands or may include holes or openings. Among the absorbent particles suggested for use in the heating layer are carbon and graphite.

U.S. Pat. No. 4,230,924— Brastad, et al., discloses material for packaging food to achieve microwave browning, which material includes a flexible dielectric substrate, in the form of a sheet of plastic, having a metallic coating. The metallic coating is preferably aluminum that has been vacuum evaporated onto one side of the substrate. The metallic coating is said to be subdivided into a number of metallic islands or pads with non-metallic gaps or strips therebetween. The metallic pads are said to generate heat in either of two modes of operation, namely, by creating a flow of current through the substrate, thus generating heat in the spaces between the islands or by permitting a portion of the microwave energy to pass through the islands and converting the remaining energy into heat. In the former mode of operation, the substrate is said to be paperboard. In the latter mode of operation the overall resistance of each island is said to be in the range from one ohm per square ($1\Omega$/sq.) to three hundred ohms per square ($300\Omega$/sq.) per island.

U.S. Pat. No. 4,434,197— Petriello, et al., discloses a cooking liner laminate. The outer layers of this laminate are preferably polytetrafluoroethylene and are substantially transparent to microwave energy. The inner layers are also formed from polytetrafluoroethylene. However, semi-conductive or energy absorbing material such as colloidal graphite is said to be disbursed within the layer. Similarly, U.S. Pat. No. 4,518,651— Wolfe, discloses a flexible composite material for use in microwave cooking packages. The composite material is said to include a porous dielectric substrate, substantially transparent to microwave radiation, and an electrically conductive coating on one surface of the substrate. The coating is said to include electrically conductive particles in a thermoplastic dielectric matrix. The electrically conductive particles, which can include carbon black and graphite, are first disbursed in the thermoplastic matrix. The thermoplastic matrix is thereafter applied to the porous substrate, for example, by means of a coating knife, and the resulting composite is subjected to preselected pressures and temperatures. Somewhat similar is the susceptor disclosed in European patent application No. 242,952— Hua-Feng Huang, published Oct. 28, 1987, which is said to include a dielectric substrate, for example, polyethylene terephthalate, coated with a mixture of electrically conductive metal or metal alloy in flake form disbursed in a thermoplastic dielectric matrix. It is indicated that graphite in flake form can be utilized as the electrically conductive material.

U.S. Pat. No. 4,640,838— Isakson, et al., discloses a means for automatically venting a vapor-type package, that means is said to include a susceptor having non-metallic microwave-absorbing particles in a non-metallic binder. The particles are said to include graphite and carbon black. In operation, the susceptor generates heat sufficient to "melt" an opening in the vapor-tight package.

U.S. Pat. No. 4,751,358— Durand, discloses an enamel which is said to incorporate electrically conductive elements in the form of a metal powder. It is suggested to apply the enamel to a microwave receptacle by hot silkscreen printing or by the decalcomania process.

Each of the above described susceptors or inductive heating elements are relatively costly to produce and, in certain situations, require elaborate manufacturing processes. Consequently, a need still exists for a microwave susceptor that not only generates the desired heat, but which is also easy and economical to manufacture.

SUMMARY OF THE INVENTION

The advantages of the present invention are achieved in a susceptor for use in microwave heating and a method for manufacturing a susceptor for use in microwave heating. The susceptor is shown to include a substrate and a coating of electrically conductive particles applied to the substrate in a printing operation. In one aspect of the invention, the coating is deposited on the substrate in a pattern that results in the distribution of microwave energy across the pattern so that burning of the substrate is prevented. Preferably, the coating is an ink composition and the electrically conductive particles are graphite disbursed in the ink composition. The pattern is shown to include a plurality of subpatterns located within an effective heating area wherein the positioning of subpatterns is sufficient to radiate the desired heat.

DETAILED DESCRIPTION OF THE EMBODIMENTS

The present invention comprises a new and novel susceptor that is not only capable of achieving requisite browning and crisping of food products when subjected to microwave radiation, but that also is extremely economical. Susceptors constructed or manufactured in accordance with the present invention are created by applying a susceptor ink to packaging materials in a printing operation. The susceptor ink generally includes the disbursement of electrically conductive particles, such as carbon and carbon black particles in an ink vehicle.

The ability to apply a susceptor by way of a standard printing operation results in a significant savings in the manufacture of both the susceptor and the microwave package over prior metallization and/or polymeric impregnation processes in order to create the susceptor. As used in this application, printing shall mean any planographic, relief, intaglio or other process for making an impression on a substrate. The significant manufacturing savings flows from two generally related factors. First, a simplified manufacturing process will result in increased productivity. In other words, since a time-consuming manufacturing process is no longer required, more susceptors can be manufactured in less time. Second, the susceptor printing process of the present invention eliminates elaborate manufacturing processes such as the need to maintain certain susceptors, e.g., polyester and a vacuum deposited layer of metal, in a wrinkle-free condition prior to inclusion in a laminate.

In order to print susceptors, a new susceptor ink has been developed. Generally, the susceptor ink includes conductive particles suspended in an appropriate vehicle having the viscosity necessary for proper transfer in a press inking system. In the preferred embodiment, the conductive particles are either carbon or carbon-based blacks such as graphite. When the susceptor ink has been applied and dried on an appropriate substrate, the electrically conductive particles will act to absorb microwave energy and convert such energy into heat. In order to assure relatively uniform conversion of microwave energy, the electrically conductive particles should be generally the same size and be substantially uniformly dispersed in the ink vehicle during printing. In one embodiment, the substantially uniform particle size can be any dimension within the range from ½ micron to 50 microns. In the preferred embodiment, the electrically conductive particles have a particle size in the range from seven to ten microns. In an especially preferred embodiment, the electrically conductive particles are graphite such as Micro 270 manufactured and sold by Asbury Graphite Mills in Asbury, N. J. It is also preferred for the susceptor ink to have a solids content, including the electrically conductive particles, greater than 40%. In any event, in order to ensure good printing properties, the solids content should not drop below 35%.

Generally, printing ink includes a carbon black substance suspended in a vehicle with a resin, a solvent, an adhesive and a drier.

The susceptor ink of the present invention, described in the examples herein, for use in the preferred embodiment of the present invention is primarily adapted for printing on paper substrate. If the printing operation were to occur on a substrate other than paper, for example polyethylene, a modifier would be required in order for the electrically conductive particles to adhere to the substrate. Such modifiers are known.

In certain circumstances, when the susceptor of the present invention is printed onto a paper substrate undesirable results can occur during use. The susceptor can generate too much heat causing burning or charring of the substrate. This result was discovered when the susceptor ink was printed onto a substrate in a generally square pattern having a per side dimension of approximately 10 cm and the susceptor was placed flat in a commercially available microwave oven. Charring and burning was observed along the edges of the pattern. It was discovered that the distribution of microwave energy across the susceptor pattern was such that energy was concentrated along the edges. The microwave field to which the susceptor was subjected was not of any particular design, but rather, was that microwave field available in the oven.

It is known that the heat generated by susceptors in microwave oven quickly dissipates as the distance from the susceptor increases. The effective distance for microwave susceptors has been estimated to be approximately 3 mm. Consequently, if a large object is to be browned on the exterior surface, a sufficiently large susceptor is necessary in order to confront the object over substantially all of the its exterior surface. However a printed susceptor which is sufficiently large to brown such an object could exhibit the charring or burning mentioned above.

Consequently, although the susceptor printing invention achieves a significant manufacturing cost savings over prior susceptor manufacturing techniques, its applicability appeared severely limited.

The solution to the above problem, which enables widespread use of the printed susceptor, is to divide the susceptor print pattern which covers the effective susceptor heating area into a plurality of components or subpatterns. Although susceptors can be of many sizes and shapes, for purposes of illustration herein it is assumed that the desired shape is a square, roughly 10 cm per side. This assumption is not viewed as limiting the scope of the invention. For example, a susceptor in accordance with the present invention can be printed in a manner coextensive with the entire surface area of the substrate.

Figure 1:
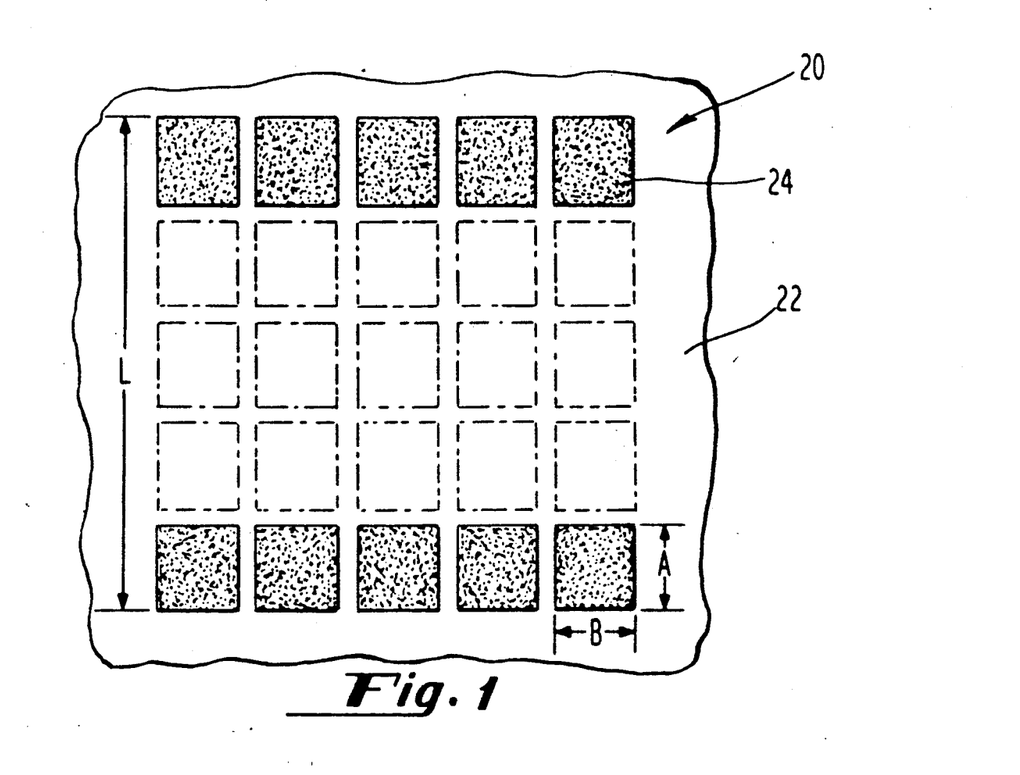
FIG. 1 is a plan view of a portion of sheet material having a susceptor in accordance with the present invention printed thereon.

A susceptor printed in accordance with the present invention is shown in FIG. 1. A print pattern, generally designated 20, is shown to be printed on a substrate 22. In the preferred embodiment, substrate 22 is a laminated paper. The layer on which susceptor 20 is printed is a 25 pound grease-proof paper that is laminated to a layer of machine glazed paper such as 30 pound bleached white paper.

Pattern 20 is shown to include a number of components or subpatterns 24. As shown in FIG. 1, component 24 is a square. Pattern 20 has an overall per side length L, which in the preferred embodiment is coextensive with the susceptor effective heating area, i.e., 10 $cm^2$. The effective heating area of pattern 20 is that area in which it is desired to generate heat, i.e., with a square that is 10 cm long on each side. Each component or rectangle 24 is shown to have a length A and a width B. It is preferred that the length and width of the shape or subpattern 24 is such that these dimensions are less than or equal to $\lambda/4$, one fourth the wave length ("$\lambda$") of the microwave to which the susceptor is subjected. Since the typical wave length of microwaves in commercially available microwave ovens is approximately 12 cm, dimensions A and B will be no larger than approximately 3 cm. It can also be said that the area of each component 24 is less than approximately 10 $cm^2$.

The space between squares 24 is selected such that arcing will not occur from square to square. It should be noted that the resistance of squares 24 will be generally uniform and that such resistance will be within the range from 1 k$\Omega$ to 50 k$\Omega$ per subpattern. It is preferred that the resistance of each subpattern be in the range from 2.5 k$\Omega$ to 3 k$\Omega$.

Figure 2:
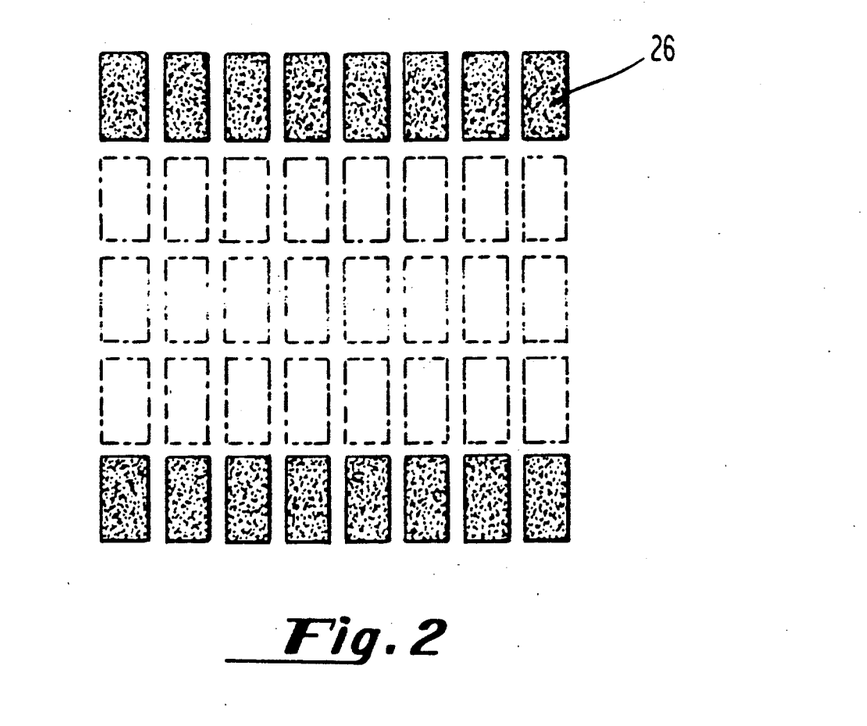
FIGS. 2-11 are alternative susceptor patterns to that shown in FIG. 1.
Figure 3:
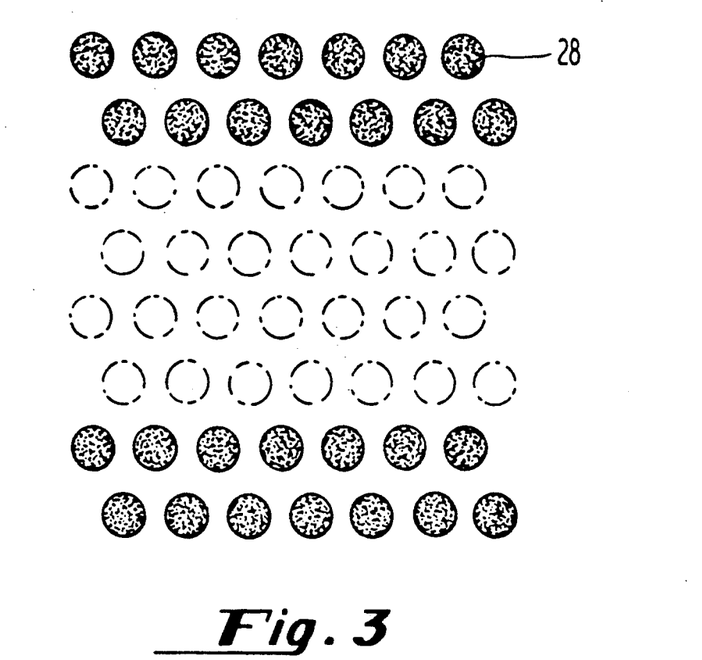
Figure 4:
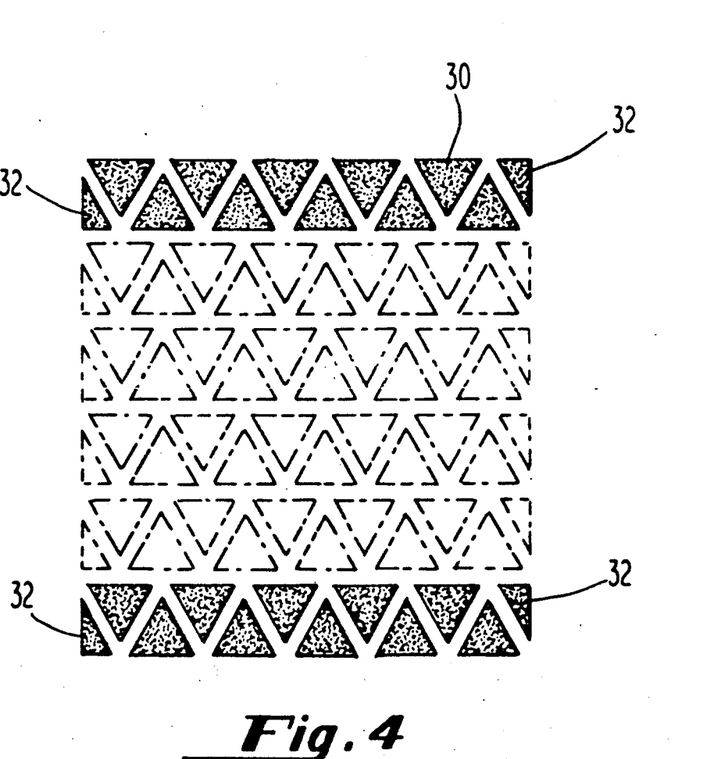
Figure 5:
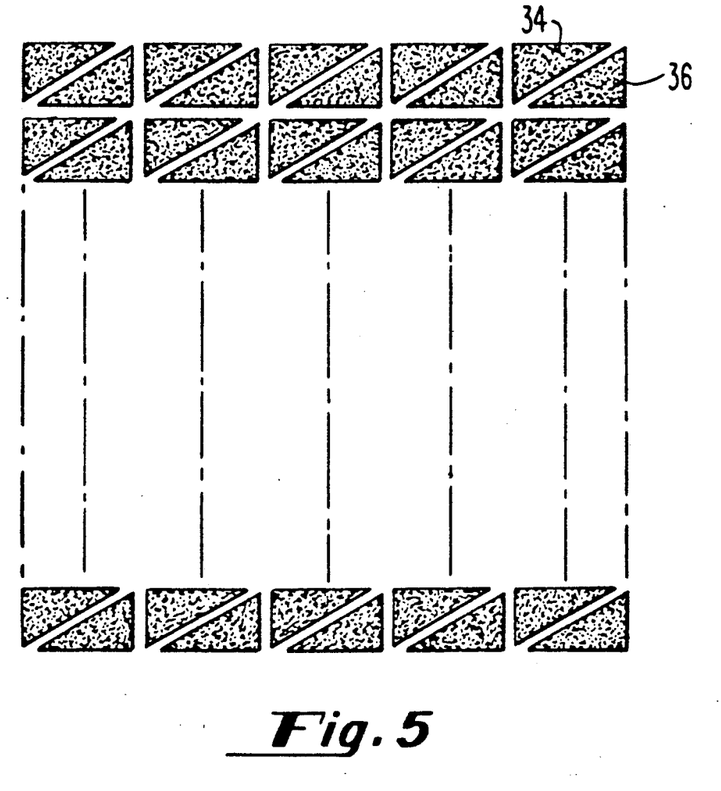

As shown in FIG. 2, squares 24 have been replaced by rectangles 26. As shown in FIG. 3, the susceptor pattern comprises a plurality of circles 28. In relation to the pattern shown in FIG. 3, it will be noted that each row of circles is offset from adjacent rows. As shown in FIG. 4, the susceptor pattern comprises a plurality of equilateral triangles 30. It will be noted that, at the end of each row, a right triangle 32 is formed wherein the hypotenuse of triangle 32 is substantially equal to a side of triangle 30. FIG. 5 is a further susceptor pattern that includes a number of right triangles 34 and 36 arranged to generally form a rectangle, i.e., the hypotenuse sides of triangles 34 and 36 face one another.

Although it is preferred that the cross-sectional area of each component of a given susceptor pattern be less than 10 $cm^2$, it has been found that for certain shapes the energy distribution problems that can occur when the component area is greater than 10 $cm^2$, in fact, do not occur. Assume that the desired susceptor area is a circle having a radius of 5 cm. A preferred pattern for such an effective area is set forth in FIG. 6 which shows a socalled bulls-eye pattern, comprising a number of concentric rings 38. Although outer ring 38 will have an actual area greater than 10 $cm^2$, the energy distribution problem does not occur. It is believed that this problem does not occur for this pattern because the width of each concentric ring is less than 3 cm, i.e., less than $\lambda/4$.

Figure 7:
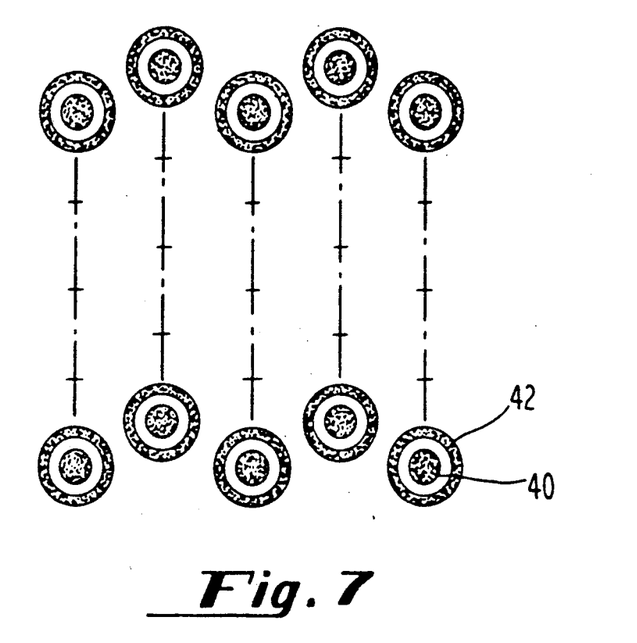
Figure 8:
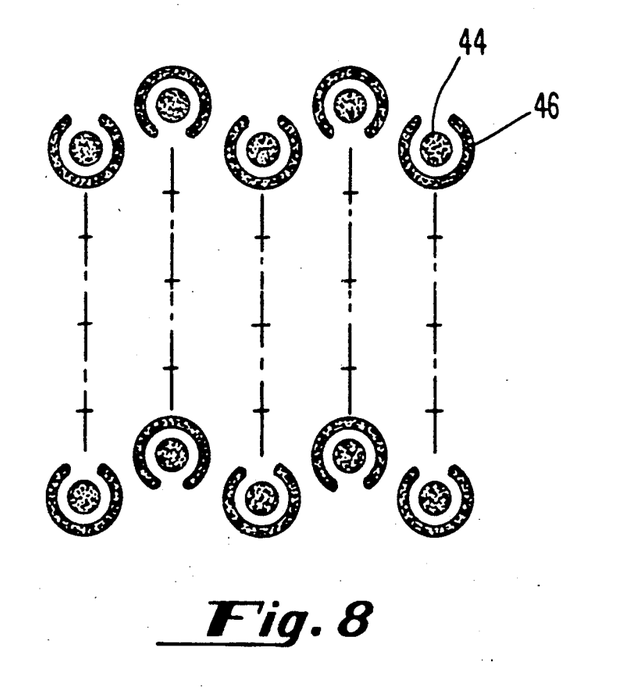
Figure 9:
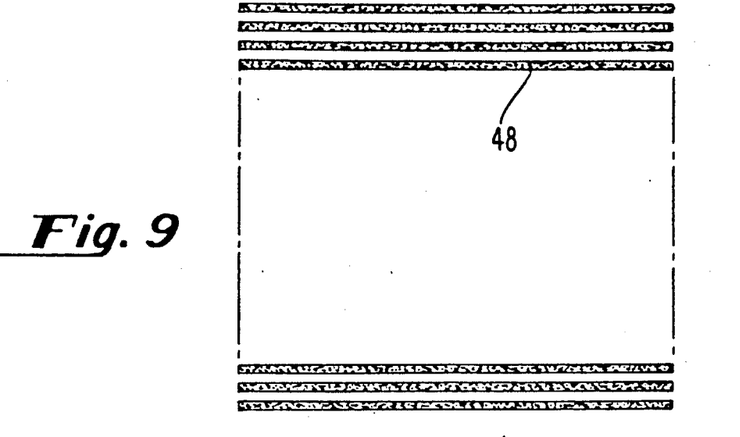

FIG. 7 is a further alternative susceptor print pattern comprising a series of circles 40 wherein each circle is surrounded by a single ring 42. FIG. 8 discloses a horseshoe-like pattern, wherein each subshape includes a circle 44 surrounded by a "C" shaped design 46. FIG. 9 discloses a susceptor pattern which includes a number of generally parallel strips 48.

Figure 6:
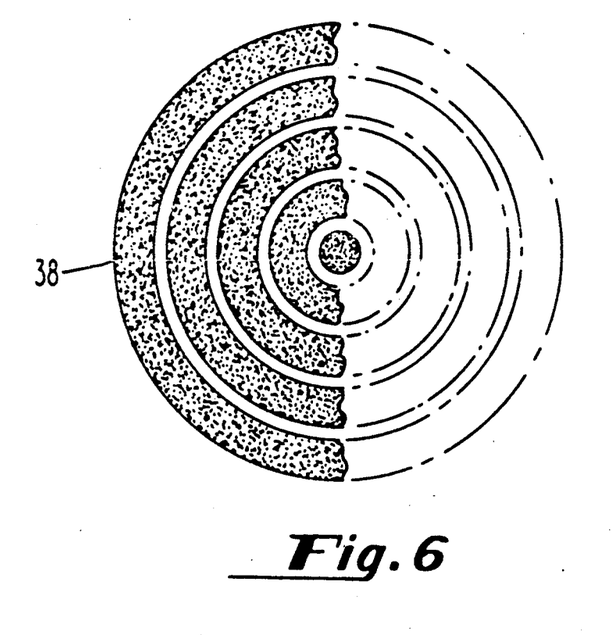
Figure 10:
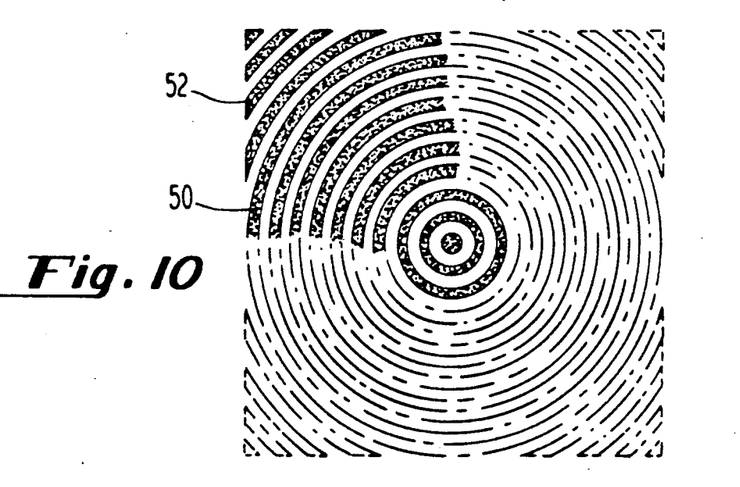
Figure 11:
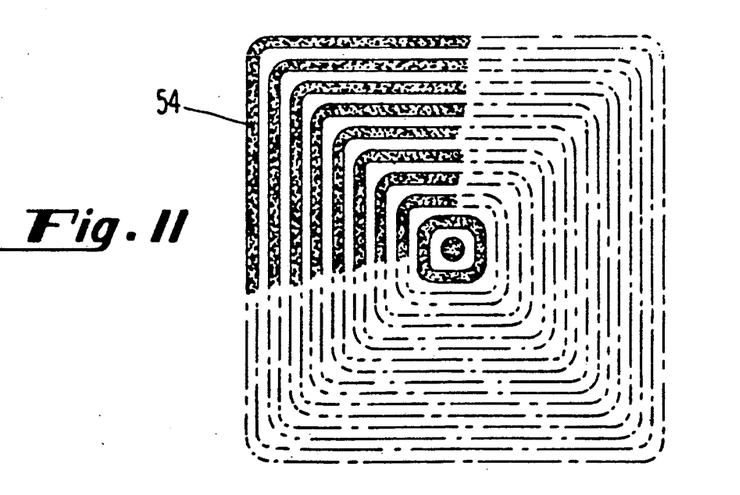

FIG. 10 is a modification of FIG. 6, wherein a plurality of concentric rings 50 are disposed within a desired rectangular susceptor pattern. In the "corners" of the pattern, a series of arcuate shaped strips 52 are provided to "fill in" the corner. A still further modification of the bulls-eye design shown in FIG. 6, can be found in FIG. 11, wherein the concentric circles have been replaced by squares 54, the sides of which are relatively equidistant from the center of the pattern. It will be noted again with relation to FIGS. 9, 10 and 11, that the overall area of any one subpattern in each of the susceptor patterns could exceed the preferred area of 10$cm^2$. However, it will be noted that the width of each subpattern is less than 3 cm, i.e., less than $\lambda/4$.

The present invention is further described by way of the following examples. Example 1 describes the construction of the popcorn bag of U.S. Pat. No. 4,735,513—— Watkins et al. Example 2 describes the construction of a popcorn bag in accordance with the present invention. Example 3 provides a test comparison of the foregoing bag types in operation. Specifically, Example 3 illustrates the preparation of a food product, namely popcorn, using the bags of Examples 1 and 2 and reports auxiliary heat generation and efficiency of food preparation. These examples are not to be considered as limiting the scope of the claims.

EXAMPLE 1

Metallized Film-Containing Popcorn Bag

A. Bag Materials & Laminate Construction. The popcorn bag used in this example is identical with an embodiment of U.S. Pat. No. 4,735,513 Watkins et al. Two sheets of paper comprise the outer and inner layers, respectively, of the laminate. The inner layer is a grease-resistant sheet (grease-proof) while the outer layer is a bleached kraft grocery-grade sheet (machine-glazed). These sheets are threaded through a dual printing/laminating machine to print the outside of the outer paper layer and to laminate the two sheets together.

The laminating adhesive (Reynolds 2868, Reynolds Co.) is applied following the printing of the outer layer, and heat-sealable adhesive (Duracet 30, Franklin Int.) is applied after lamination. This adhesive is used later in converting the laminated rollstock to popcorn bags. "Printing" as used in this example does not refer to a printed susceptor in accordance with the invention, but rather, refers to the printing of advertising materials and the like on the outside surface of the laminate.

Immediately before the lamination stage, another adhesive (Electromek 2417-A, Electromek Co.) is applied to a small (10 cm × 10 cm) area of the inner layer. This special adhesive can withstand elevated temperatures, as are encountered when using microwave susceptors. Then a metallized polyester film patch is applied to the inner layer in register with the heat-resistant adhesive layer. Thus, the bag rollstock consists of three structural layers, the inner and outer being paper, and the middle being metallized polyester film.

B. Bag Converting. The rollstock is converted on a pillow style bag converting machine. On this machine, we introduce gussets in the bag, seal the bag material over, and cut and stack the finished bags. The final product is identical to the embodiment shown in FIG. 5 of U.S. Pat. No. 4,735,513 (Watkins, et al.).

EXAMPLE 2

Printed Susceptor-Containing Popcorn Bag

A. Ink Preparation. The ink composition was prepared in two stages; first, the ink carrier or vehicle was prepared, and second the desired amount of pigment was added to the vehicle and diluted with water to obtain desired viscosity.

The ingredients of this ink vehicle comprised 30.0 g of acrylic resin (Joncryl 678, S. C. Johnson INC.), 0.1 g of an antifoaming agent (1520 antifoam, Dow Chemical Co.), 6.0 g of anhydrous isopropanol, 9.0 g of 28% (by weight) ammonium hydroxide and 54.9 g of solvent, i.e., water. These ingredients were mixed in a blender for thirty minutes to obtain 100.0 g of 30% solids ink vehicle. Other ink vehicles can be used in this regard, such as those based on starch, casein and other proteins, rosin and rosin copolymers, resinates, etc.

The ink composition was obtained by adding 30.0 g of graphite pigment (Micro 270, Asbury Graphite Mills, Inc.) to 57.5 g of the above-mentioned ink vehicle. 12.5 g of water was added to dilute the ink to a viscosity of 41s (#2 Zahn) to thereby obtain 100.0 g of susceptor ink. This viscosity is typical of flexographic inks, and should not be viewed as a limiting value.

The graphite particle size is important, and as indicated previously should fall in the range between 0.5 $\mu$m to 50 $\mu$m in diameter. Larger particles are more difficult to disperse properly, and require constant agitation for uniformity. Smaller particles are too fine, and can be transported through the paper, thus limiting their effectiveness at forming a microwave interactive layer. Micro 270 is a grade with particle sizes ranging between 7 $\mu$m and 10 $\mu$m in diameter, which is believed to be optimum for this formulation.

B. Printing Process. The ink composition was designed for use in a flexographic printing apparatus, although it is noted that other forms of printing could be used equally as well, such as rotogravure, lithograph, or letterpress. The optimum ink viscosity for this process is known to be from 20 to 80s (#2 Zahn). However, other printing processes have different viscosity requirements. Thus, this number should not be taken as a limiting value.

In a flexographic printing operation, ink is metered onto an anilox roll engraved with a network of cells with a defined size and depth, which defines the coating weight of the ink layer. This volume is then transferred onto a photopolymer applicator roll, which in turn applies the ink to the paper sheet.

C. Description of Pattern. The susceptor pattern used in this example was the square gridwork (FIG. 1). The pattern was set to where the individual square printed areas 3 mm×3 mm, and the spacing between them was ½ mm. For comparison purposes, the pattern of a solid square approximately 10 cm on a side was also printed.

D. Bag Construction. All materials used in the construction of the bags were identical to the materials used in Example #1 above. However, since no patch is attached to the inner layer as was the case in Example 1, there was no additional layer of heat resistance adhesive. Additionally, the bag used in this example was a two-layer construction, as opposed to the construction of U.S. Pat. No. 4,735,513 (Watkins, et al.) which is a three layer construction.

For the purposes of this example, printed susceptor rollstock was not converted into bags on existing machinery; rather, the bags were hand-made by taping individual printed patterns that had been printed on grease-resistant sheet into existing blank bags with heat resistant tape (Kapton, E. I. DuPont de Nemours, Inc). This tape is not microwave interactive. The paper materials used in constructing the bags in Examples #1 and 2 are identical.

EXAMPLE 3

Comparison Between Metallized Film and Printed Patterns as Microwave Susceptors in Popcorn Bags Comparison A: Popping Corn For 3 ¼ Minutes For Each Trial Bag The following table comprises data obtained for one brand of microwave popping corn (Jolly Time) and a 650 Watt microwave oven (Tappen Model #56-9338). The time was kept constant to evaluate the popping efficiencies of each bag type, i.e., examples 1 and 2 with the same amount of exposure to microwave energy. The initial charge of popcorn is 60 g, and the initial oil load is 20 g.

| BAG TYPE[a] | YIELD[b] | VOLUME[c] | MAX. T.[d] | CHARRING[e] | SCORCHING[f] |
| --- | --- | --- | --- | --- | --- |
| 1 | 82 | 1.9 | 210 | n | none |
| 2 | 82 | 1.7 | 160 | m-h | light |
| 3 | 81 | 1.6 | 160 | n | none |

The legend above is described as follows:
- a—Bag types are (1) Metallized film bag from Example 1; (2) Example 2 bag having a solid printed susceptor pattern; and (3) Example 2 bag having a printed susceptor pattern similar to that shown in FIG. 1.
- b—Yield = 100× (weight unpopped kernels)/(initial weight)
- c—Volume of popped kernels, in liters
- d—Maximum temperature reached by susceptor, in °C.
- e—n=none; l=light; m=moderate; h=heavy
- f—Scorching refers to the popcorn, while charring refers to the bag.

This trial shows that the patterned susceptor is of comparable efficiency to the metallized film susceptor. However, unlike the solid printed susceptor, the pattern did not char the outer layer of the popcorn bag. The advantage of the present invention is that the graphite concentration can be tailored effecting popping efficiency while keeping charring at an acceptable level. Such flexibility is not possible with metallized film.

Comparison B: Popping Corn As Per Instructions (1-2s Between Pops)

In this example, the overall expected yields from the above popcorn bags is examined, as well as the overall appeal of the finished product. Here, the time to finish popping was maintained in lieu of the maximum temperature, which is assumed to be roughly constant. Those bags which exhibited charring and scorching problems above were expected to be slightly worse in this trial.

| BAG TYPE[a] | YIELD[b] | VOLUME[c] | TIME[d] | CHARRING[e] | SCORCHING[f] |
|---|---|---|---|---|---|
| 1 | 87 | 1.9 | 3:33 | 1 | moderate |
| 2 | 86 | 1.6 | 3:59 | h | heavy |
| 3 | 90 | 1.8 | 4:17 | n-1 | moderate |

The legend here is the same as above, with the exception of:

d—The time needed to reach the "fully popped state", as described in the section title.

In this trial, the printed susceptor clearly surpassed the metallized film susceptor in the area of percentage yield. The printed susceptor was also comparable to metallized film susceptors in the areas of charring, scorching, and popped volume. The printed susceptor took about 45 seconds longer to reach a fully popped state. However, as mentioned previously, it is possible to increase the graphite concentration slightly to increase the heating, while maintaining acceptable scorching and charring levels. This tailoring cannot be done with metallized film susceptors.

Figure 12:
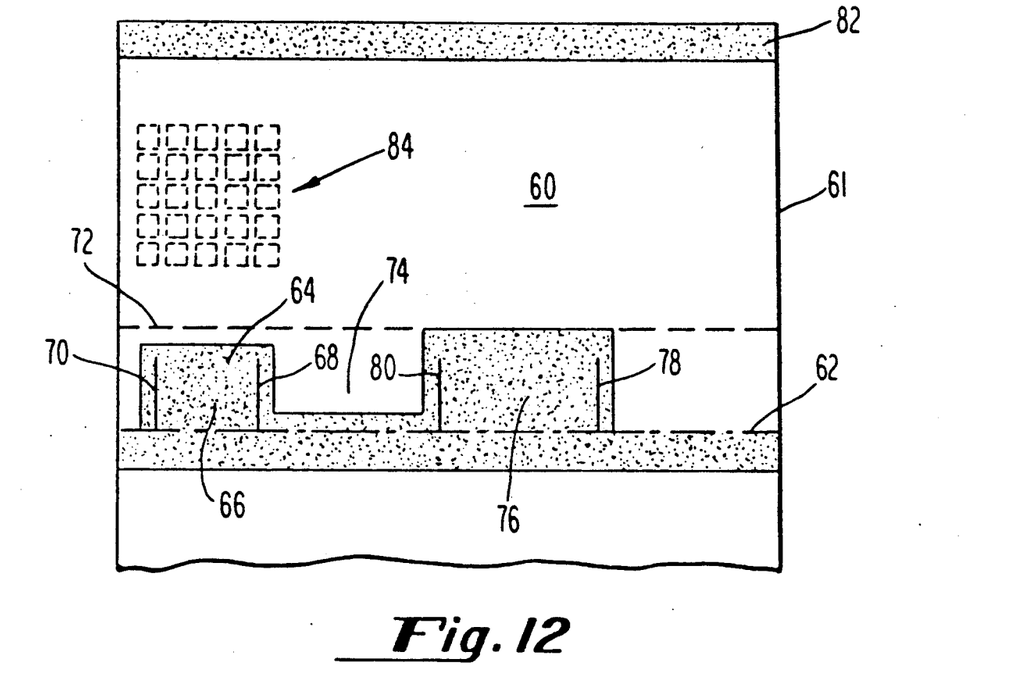
FIG. 12 is a plan view of a portion of a paper web during manufacture onto which a susceptor according to the present invention has been printed.

It will be noted that the susceptor of the present invention need not be printed on the surface of the substrate that contacts the food products to be heated, but, can be printed on the exterior surface of such substrate. In FIG. 12, sheet 60 is shown, which sheet is to be formed into a bag. Sheet 60 is a part of a continuous web 61 from which numerous bags are to be manufactured. In order to form individual bags, sheet 60 is cut along line 62 in any known manner. A preselected pattern of adhesive coating is shown pre-applied to the inside surface of sheet 60 by any known method. Such coating of adhesive 64 covers tongue 66, extends laterally beyond slits 68 and 70 and extends longitudinally towards line 72. Adhesive is also shown to be deposited along the bottom edge of side flap 74. Adhesive is also shown to cover tongue 76 extending laterally beyond slits 78 and 80 and longitudinally towards line 72. A further strip of adhesive is shown to be deposited along cut line 82. Although not shown, it will be understood that a strip of adhesive will be deposited along one of the side edges of web 61 so that the side edges can be joined in the bag forming operation. A susceptor 84, in accordance with the present invention, is shown as having been printed on sheet 60 on the side opposite the adhesive.

Figure 13:
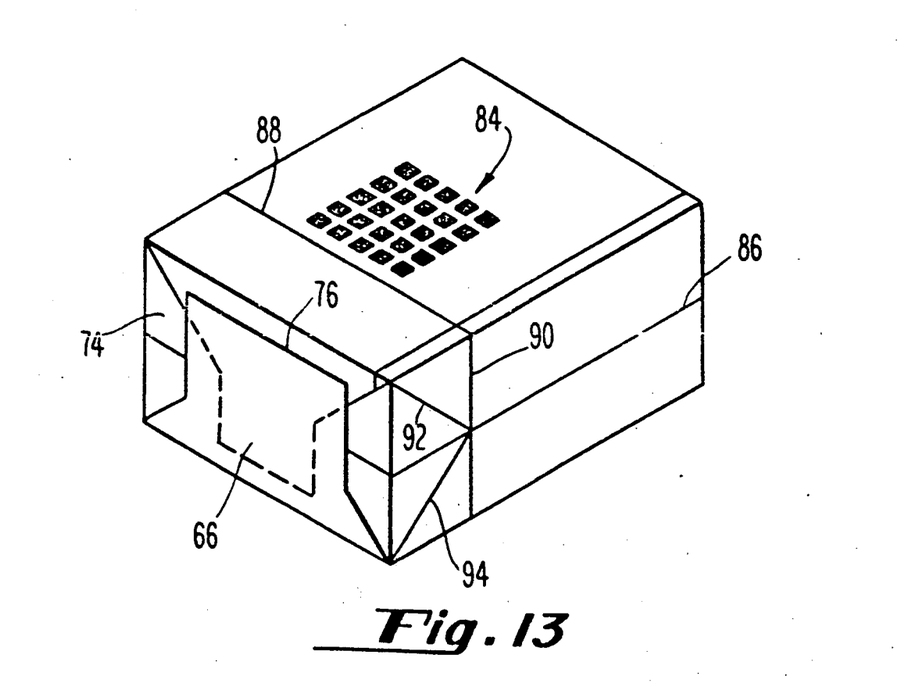
FIG. 13 is a perspective view of a bag formed from the paper web shown in FIG. 12.

In the preferred embodiment, a pre-applicable, heat sealable, reactivatable, pressure sensitive adhesive is used for adhesive 64, for example, polyvinyl acetate. Utilizing such an adhesive, sheet 60 can be formed into a so-called SOS (self opening style) bottom bag as shown in FIG. 13. To achieve the desired shape, centrally folding gussets 86 are formed in the sidewalls of the bag. Transfer fold lines 88 and 90 and diagonal fold lines 92 and 94 are formed in any known manner. Although not shown, it will be understood that fold lines similar to lines 90, 92 and 94 are also formed in the side of the bag in which side flap 74 is formed. Typically, the manufacture of such bags involves first forming sheet 60 into a tube by joining its side edges. The tube is thereafter flattened along inwardly folding gussets 86 and thereafter manipulated in such flattened form. After folding inside flaps and folding over tongues 66 and 76, the bag is sealed through the application of heat and pressure in any known manner. Thus, it can be seen that a bag is formed having susceptor 84 printed on the exterior surface thereof.

Figure 14:
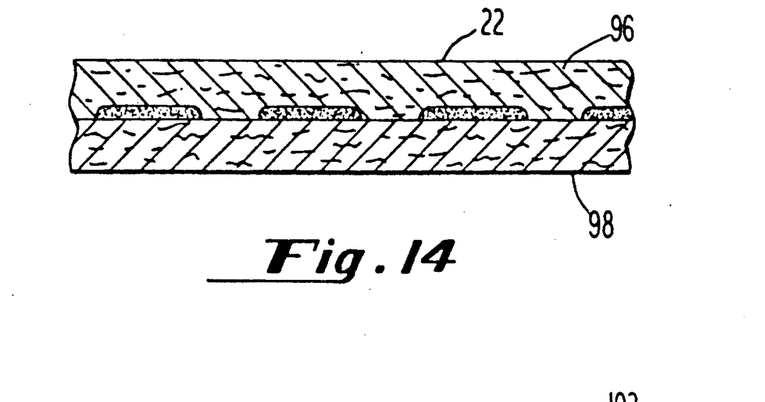
FIG. 14 is a section view of a laminate formed in accordance with the present invention.

Although the susceptor has been shown on the exterior surface of bag 13, it should also be noted that the susceptor can be printed between laminate layers. It will be recalled that substrate 22, shown in FIG. 1, in the preferred embodiment, included a laminated paper. The laminate included one layer of grease-proof 25 pound paper and a second layer of machine glazed paper. It is within the scope of the present invention, as shown in FIG. 14, to position the susceptor coating between the grease-proof and machine glazed layers 96 and 98. In that embodiment, susceptor ink is first printed on grease-proof layer 98 and allowed to dry. Thereafter, utilizing any known process, such as by an adhesive, the machine glazed layer 96 is adhered to grease-proof layer 98 covering the printed susceptor.

Figure 15:
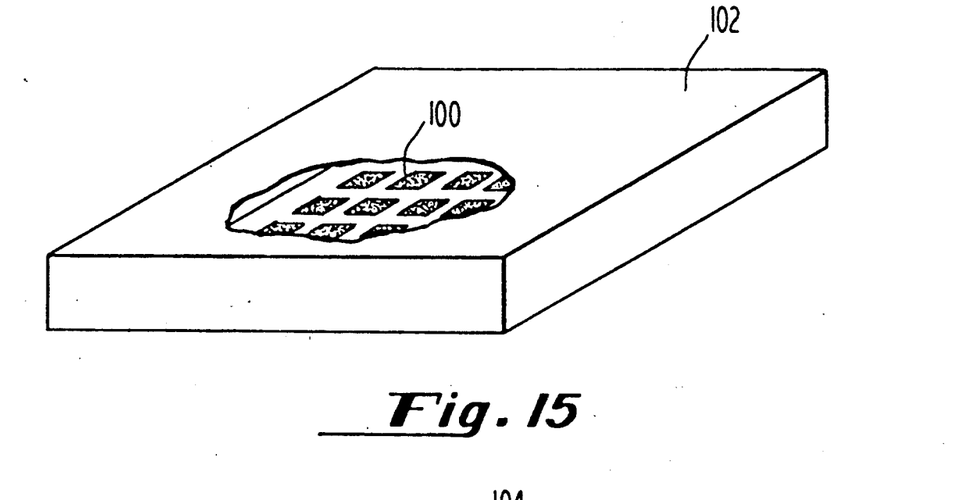
FIG. 15 is a perspective view having a partial cutaway portion of a box suitable for microwave heating and having a susceptor in accordance with the present invention.

As shown in FIG. 15, susceptor 100 has been printed onto the interior surface of a box 102. Box 102 is formed from any suitable material, such as paperboard, which is substantially transparent to microwave radiation. Box 102 can be formed in any known fashion.

In addition to the above desired susceptor ink and susceptor patterns, it has been discovered that the thickness of the ink coating on the substrate will affect the temperature generated when the susceptor is placed in a microwave oven. It has been discovered that the thicker the coating, the greater the temperature in operation.

Figure 16:
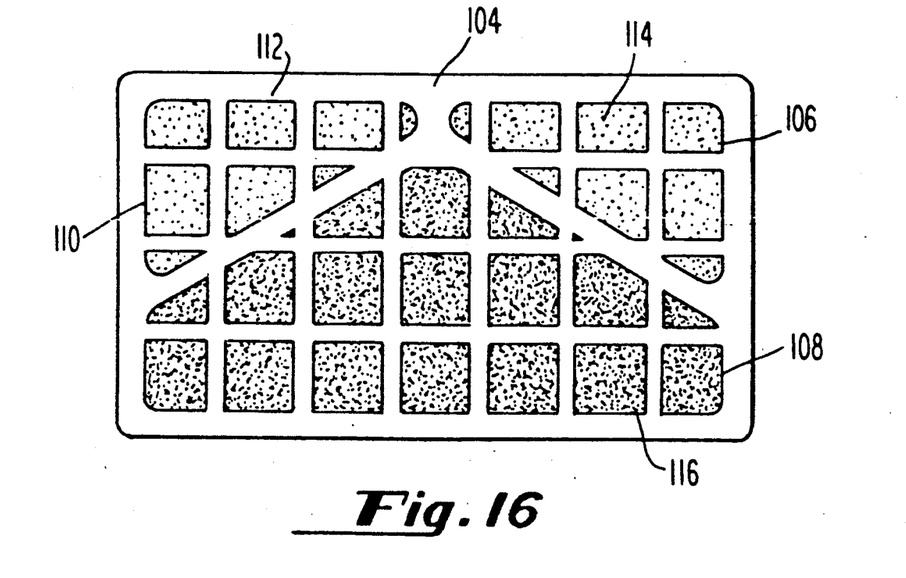
FIG. 16 is a plan view of a microwave tray having a number of susceptors in accordance with the present invention.

As indicated above, by varying the concentration or density of electrically conductive particles in the susceptor ink, the upper temperature limit of the susceptor can be controlled. As shown in FIG. 16, the susceptor of the present invention has been printed on a microwave tray 104. Although shown in plan view, it will be understood that tray 104 comprises a number of wells 106, 108 and 110. Typically, a different food product is placed within each well. In the embodiment shown in FIG. 16, the products to be placed in wells 106 and 110 require lesser amounts of auxiliary heat than the product placed in well 108. To that end, the concentration or density of printed susceptors 112 and 114 are less than susceptor 116. Consequently, susceptor 116 will generate higher temperatures.

Still further, it has been discovered that when a susceptor is printed in accordance with the present invention, the roughness of the substrate will have an effect on the microwave activity, i.e., the degree of energy conversion in the susceptor. As the substrate becomes rougher, less microwave activity takes place at a given coating weight.

While the invention has been described and illustrated with reference to specific embodiments, those skilled in the art will recognize that modification and variations may be made without departing from the principles of the invention as described herein above and set forth in the following claims.

What is claimed is:

1. A susceptor for use in microwave heating, comprising:
   a substrate; and
   a coating of electrically conductive carbon particles selectively applied only to predetermined areas of said substrate in a pattern having subpatterns in a spaced relationship adapted to distribute microwave energy across said pattern so as to substantially prevent burning of the substrate.

2. The susceptor of claim 1, wherein said substrate is utilized as microwave packaging.

3. The susceptor of claim 1, wherein said coating is an ink coating and wherein said ink coating is applied to said substrate in a printing operation.

4. The susceptor of claim 1, wherein a plurality of said subpatterns are located within an effective heating area, the positioning of said subpatterns being sufficient to radiate the desired heat in said effective heating area.

5. The susceptor of claim 4, wherein said subpatterns are substantially identical.

6. The susceptor of claim 5, wherein each of said subpatterns comprises a square.

7. The susceptor of claim 5, wherein each of said subpatterns comprises a rectangle.

8. The susceptor of claim 5, wherein each of said subpatterns comprises a circle.

9. The susceptor of claim 5, wherein each of said subpatterns comprises an equilateral triangle.

10. The susceptor of claim 5, wherein each of said subpatterns comprises a right triangle.

11. The susceptor of claim 5, wherein each of said subpatterns comprises a circle within a ring.

12. The susceptor of claim 5, wherein each of said subpatterns comprises a circle within a horseshoe.

13. The susceptor of claim 5, wherein each of said subpatterns comprises a stripe.

14. The susceptor of claim 4, wherein said pattern comprises a bulls-eye.

15. The susceptor of claim 14, further comprising arcuate shaped stripes.

16. The susceptor of claim 14, wherein said bulls-eye comprises a number of rings and wherein said rings are generally rectangular shaped.

17. The susceptor of claim 1, wherein said subpatterns are adapted to distribute said microwave energy substantially evenly across said pattern.

18. The susceptor of claim 1, wherein said coating is an ink composition comprising said electrically conductive carbon particles and a vehicle in which said electrically conductive carbon particles are generally uniformly suspended, said vehicle having a viscosity so that said ink composition can be utilized in printing.

19. The susceptor of claim 18, wherein said electrically conductive carbon particles are selected from the group consisting of carbon and carbon based blacks.

20. The susceptor of claim 19, wherein said electrically conductive carbon particles are graphite.

21. The susceptor of claim 20, wherein said graphite has a particle size in the range from 7 to 10 μm.

22. The susceptor of claim 18, wherein said vehicle comprises a binder and a defoaming agent.

23. A method of manufacturing a susceptor for use in microwave heating, comprising the steps of:
providing a substrate;
providing a coating composition comprising a suspension of electrically conductive carbon particles; and
selectively printing a pattern only on predetermined areas of said substrate with said coating composition, said pattern having subpatterns in a spaced relationship adapted to distribute microwave energy across said pattern so as to substantially prevent burning of the substrate.

24. The method of claim 23, wherein a plurality of said subpatterns are located within an effective heating area, the positioning of said subpatterns being sufficient to radiate the desired heat in said effective heating area.

25. A method of heating an article in a microwave oven, comprising the steps of:
confronting at least a surface portion of the article to be heated with a susceptor, said susceptor comprising a substrate and an ink coating selectively applied only to predetermined areas of said substrate in a pattern, said ink coating comprising electrically conductive carbon particles and said pattern having subpatterns in a spaced relationship adapted to distribute microwave energy across said pattern so as to substantially prevent burning of the substrate; and
subjecting said article and susceptor to microwave radiation.

26. A method of manufacturing a susceptor for use in microwave heating, comprising the steps of:
mixing carbon based black particles with a vehicle to form a susceptor ink;
selectively applying said susceptor ink only to predetermined areas of a substrate by printing a pattern on said substrate, said pattern having subpatterns in a spaced relationship adapted to distribute microwave energy across said pattern so as to substantially prevent burning of the substrate; and
drying said susceptor ink after application to said substrate.

27. A susceptor for use in microwave heating, comprising:
a first layer;
a printed coating of electrically conductive carbon particles selectively applied only to predetermined areas of said first layer so as to form a pattern having subpatterns in a spaced relationship adapted to distribute microwave energy across said pattern so as to substantially prevent burning of the substrate; and
a second layer adhered to said first layer so as to cover said printed coating.

28. A bag for use in microwave packaging, comprising:
a substrate which has been formed into a bag structure; and
a printed coating of electrically conductive carbon particles selectively applied only to predetermined areas of said substrate so as to form a pattern having subpatterns in a spaced relationship adapted to distribute microwave energy across said pattern so as to substantially prevent burning of the substrate.

29. The bag of claim 28, wherein said bag structure includes side walls and said coating is positioned on one of said side walls.

30. The bag of claim 28, wherein said bag structure comprises a self opening style bottom.

31. The bag of claim 28, wherein said bag structure comprises a pillow style bag.

32. A package for use in microwave heating, comprising:
a container formed from material which is substantially transparent to microwave energy; and
a susceptor, positioned within said container, comprising a substrate and a printed coating of electrically conductive carbon particles selectively applied only to predetermined areas of said substrate so as to form a pattern having subpatterns in a spaced relationship adapted to distribute microwave energy across said pattern so as to substantially prevent burning of the substrate.

33. The package of claim 32, wherein said substrate is integrally formed in said container.

34. The package of claim 33, wherein said container is a box.

35. The package of claim 33, wherein said container is a tray having a number of wells.

36. The package of claim 35, wherein said susceptor is printed on at least one of said wells.

37. The package of claim 35, wherein a first susceptor having a first density is printed in a first well and a second susceptor having a second density is printed in a second well.

* * * * *